US012651284B2

(12) United States Patent
Chen et al.

(10) Patent No.: US 12,651,284 B2
(45) Date of Patent: Jun. 9, 2026

(54) SYSTEMS AND METHODS FOR GENERIC ASPECT-BASED SENTIMENT ANALYSIS

(71) Applicant: Capital One Services, LLC, McLean, VA (US)

(72) Inventors: David Chen, Durham, NC (US); Maury Courtland, Durham, NC (US); Aysu Ezen Can, Cary, NC (US); Sahil Badyal, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 771 days.

(21) Appl. No.: 17/968,714

(22) Filed: Oct. 18, 2022

(65) Prior Publication Data

US 2024/0127297 A1 Apr. 18, 2024

Related U.S. Application Data

(60) Provisional application No. 63/416,771, filed on Oct. 17, 2022.

(51) Int. Cl.
*G06F 40/30* (2020.01)
*G06F 3/0484* (2022.01)
(Continued)

(52) U.S. Cl.
CPC ....... *G06Q 30/0282* (2013.01); *G06F 3/0484* (2013.01); *G06F 40/30* (2020.01); *G06N 20/20* (2019.01)

(58) Field of Classification Search
CPC ... G06F 40/30; G06F 3/0484; G06Q 30/0282; G06N 20/20
See application file for complete search history.

(56) References Cited

U.S. PATENT DOCUMENTS 8,799,773 B2 * 8/2014 Reis ...................... G06F 16/345
707/750
10,628,528 B2 4/2020 He et al.
(Continued)

FOREIGN PATENT DOCUMENTS

| CN | 112163091 A | 1/2021 |
| CN | 113837265 A | 12/2021 |
| WO | 2021258058 A1 | 12/2021 |

OTHER PUBLICATIONS

Chen, Z. et al., "Relation-Aware Collaborative Learning for Unified Aspect-Based Sentiment Analysis," Proceedings of the 58th Annual Meeting of the Association for Computational Linguistics, pp. 3685-3694 (Jul. 2020).
(Continued)

*Primary Examiner* — Beau D Spratt
(74) *Attorney, Agent, or Firm* — TROUTMAN PEPPER LOCKE LLP; Christopher J. Forstner; John A. Morrissett

(57) ABSTRACT

Disclosed embodiments may include a method for generic aspect-based sentiment analysis. The system may receive training data, which is used to train one or more machine learning models. The system may receive data, which may be transcribed call data. The system may extract one or more aspects from the call data using one machine learning model. For each aspect, the system may determine a sentiment polarity. The system may filter the aspects and sentiment polarities and analyze trends based on the filtered aspects and sentiment polarities. The system may output a result to a dynamic graphical user interface based on the trends. This may allow a user to detect customer attitudes toward a variety of subjects and trends over time without training machine learning models for specific domains.

19 Claims, 4 Drawing Sheets

(51) Int. Cl.
    *G06N 20/20*     (2019.01)
    *G06Q 30/0282*    (2023.01)

(56) References Cited

U.S. PATENT DOCUMENTS

| | | | | |
|---|---|---|---|---|
| 11,675,823 B2 * | 6/2023 | Kanagovi | G06F 16/3346 | |
| | | | 707/739 | |
| 11,741,143 B1 * | 8/2023 | Malladi | G06N 3/088 | |
| | | | 715/254 | |
| 12,079,629 B2 * | 9/2024 | Shalev | G06N 3/0442 | |
| 2012/0191730 A1 * | 7/2012 | Parikh | G06Q 30/0201 | |
| | | | 707/754 | |
| 2015/0195406 A1 * | 7/2015 | Dwyer | G06F 21/6254 | |
| | | | 379/265.07 | |
| 2019/0005027 A1 * | 1/2019 | He | G06F 40/35 | |
| 2021/0158919 A1 * | 5/2021 | Meltabarger | G16H 10/60 | |
| 2022/0188636 A1 * | 6/2022 | Pham | G06N 3/08 | |
| 2022/0377582 A1 * | 11/2022 | Sakamoto | H04W 24/02 | |
| 2024/0095449 A1 * | 3/2024 | Ranganathan | G06F 40/216 | |

OTHER PUBLICATIONS

He, R. et al., "An Interactive Multi-Task Learning Network for End-to-End Aspect-Based Sentiment Analysis," Proceedings of the 57th Annual Meeting of the Association for Computational Linguistics, pp. 504-515 (Jul. 2019).
Li, X. et al., "A Unified Model for Opinion Target Extraction and Target Sentiment Prediction," AAAI Technical Track: Natural Language Processing, vol. 33 (Jul. 17, 2019).
Li, X. et al. "Exploiting BERT for End-to-End Aspect-based Sentiment Analysis," Proceedings of the 5th Workshop on Noisy User-generated Text (W-NUT 2019), pp. 34-41 (Nov. 2019).
Liang, Y. et al., "A Dependency Syntactic Knowledge Augmented Interactive Architecture for End-to-End Aspect-based Sentiment Analysis," arXiv:2004.01951v1 (Apr. 4, 2020).
Liang, Y. et al., "An Iterative Multi-Knowledge Transfer Network for Aspect-Based Sentiment Analysis," arXiv:2004.01935 (Sep. 2, 2021).
Liu, S. et al., "Jointly Modeling Aspect and Sentiment with Dynamic Heterogeneous Graph Neural Networks," arXiv:2004.06427 (Apr. 14, 2020).
Liu, Y. et al., "RoBERTa: A Robustly Optimized BERT Pretraining Approach," arXiv:1907.11692 (Jul. 26, 2019).
Luo, H. et al., "GRACE: Gradient Harmonized and Cascaded Labeling for Aspect-based Sentiment Analysis," Findings of the Association for Computational Linguistics: EMNLP 2020, pp. 54-64 (Nov. 2020).
Mitchell, M. et al., "Open Domain Targeted Sentiment," Proceedings of the 2013 Conference on Empirical Methods in Natural Language Processing, pp. 1643-1654 (Oct. 2013).
Peng, H. et al., "Knowing What, How and Why: A Near Complete Solution for Aspect-Based Sentiment Analysis," AAAI Technical Track: Natural Language Processing, vol. 34 (Apr. 2020).
Pontiki, M. et al., "SemEval-2016 Task 5: Aspect Based Sentiment Analysis," Proceedings of the 10th International Workshop on Semantic Evaluation (SemEval-2016), pp. 19-30 (Jun. 2016).
Pontiki, M. et al., "SemEval-2015 Task 12: Aspect Based Sentiment Analysis," Proceedings of the 9th International Workshop on Semantic Evaluation (SemEval 2015), pp. 486-495 (Jun. 2015).
Pontiki, M. et al., "SemEval-2014 Task 4: Aspect Based Sentiment Analysis," Proceedings of the 8th International Workshop on Semantic Evaluation (SemEval 2014), pp. 27-35 (Aug. 2014).
Sanh, V. et al., "DistilBERT, a distilled version of BERT: smaller, faster, cheaper and lighter," arXiv:1910.01108 (Oct. 2, 2019).
Sohn, K. et al., "FixMatch: Simplifying Semi-Supervised Learning with Consistency and Confidence," 34th Conference on Neural information Processing Systems (NeurIPS 2020).
Wan, H. et al., "Target-Aspect-Sentiment Joint Detection for Aspect-Based Sentiment Analysis," AAAI Technical Track: Natural Language Processing, vol. 34 (Apr. 2020).
Xie, Q. et al., "Unsupervised Data Augmentation for Consistency Training," 34th Conference on Neural information Processing Systems (NeurIPS 2020).
Zhang, M. et al., "Neural Networks for Open Domain Targeted Sentiment," Proceedings of the 2015 Conference on Empirical Methods in Natural Language Processing, pp. 612-621 (Sep. 2015).
Chen, D. et al., "Unsupervised Data Augmentation for Aspect Based Sentiment Analysis," Proceedings of the 29th International Conference on Computational Linguistic, pp. 6746-6751 (Oct. 2022).

* cited by examiner

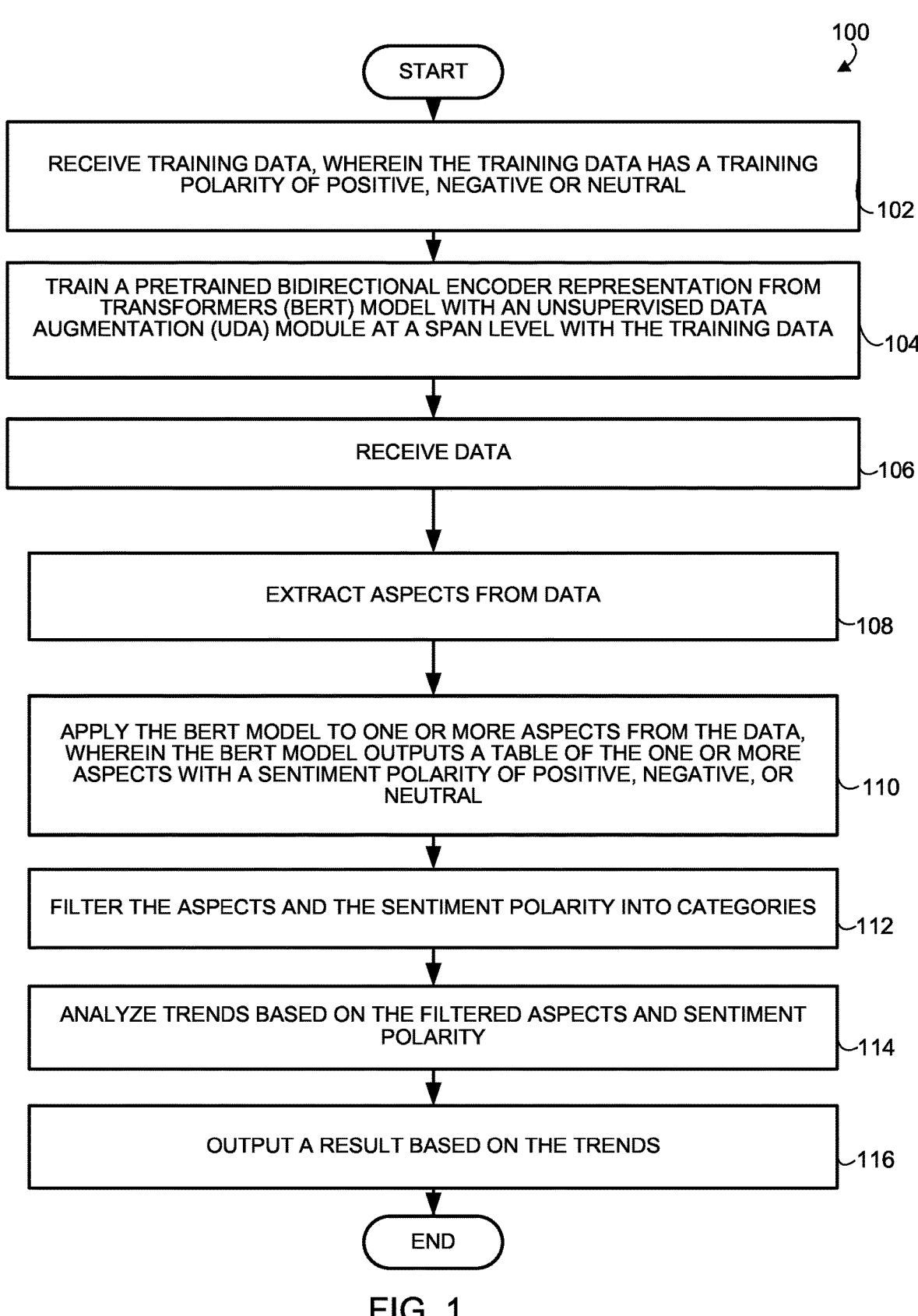

100

START

RECEIVE TRAINING DATA, WHEREIN THE TRAINING DATA HAS A TRAINING POLARITY OF POSITIVE, NEGATIVE OR NEUTRAL ⌐102

TRAIN A PRETRAINED BIDIRECTIONAL ENCODER REPRESENTATION FROM TRANSFORMERS (BERT) MODEL WITH AN UNSUPERVISED DATA AUGMENTATION (UDA) MODULE AT A SPAN LEVEL WITH THE TRAINING DATA ⌐104

RECEIVE DATA ⌐106

EXTRACT ASPECTS FROM DATA ⌐108

APPLY THE BERT MODEL TO ONE OR MORE ASPECTS FROM THE DATA, WHEREIN THE BERT MODEL OUTPUTS A TABLE OF THE ONE OR MORE ASPECTS WITH A SENTIMENT POLARITY OF POSITIVE, NEGATIVE, OR NEUTRAL ⌐110

FILTER THE ASPECTS AND THE SENTIMENT POLARITY INTO CATEGORIES ⌐112

ANALYZE TRENDS BASED ON THE FILTERED ASPECTS AND SENTIMENT POLARITY ⌐114

OUTPUT A RESULT BASED ON THE TRENDS ⌐116

END

FIG. 1

SYSTEMS AND METHODS FOR GENERIC ASPECT-BASED SENTIMENT ANALYSIS

CROSS-REFERENCE TO RELATED APPLICATIONS

This application claims priority under 35 U.S.C. § 119(e) to, U.S. Provisional Patent Application No. 63/416,771, filed Oct. 17, 2022, the entire contents of which is fully incorporated herein by reference.

FIELD

The disclosed technology relates to systems and methods for generic aspect-based sentiment analysis. Specifically, this disclosed technology relates to aspect-based sentiment analysis (ABSA) that is not specialized to a specific domain. This allows for a machine learning models that can detect sentiment generally and do not require the same amount of engineering effort and training data to adapt the models from one specific domain to another.

BACKGROUND

Companies have vested interest in improving their products and services. The core in this endeavor is knowing what services/products the customers are happy with and what they dislike. Knowing this information enables companies to set priorities for their development efforts and build a better customer experience. The insights regarding customer satisfaction comes from aspect-based sentiment analysis (ABSA) task where the aspects to which customers are showing feelings towards are determined as well as the sentiments for each aspect.

Aspect-based sentiment analysis is a challenging task in the NLP community due to its domain-dependent nature. A machine learning model that works for one domain, such as restaurants, typically do not generalize well to another domain, such as banking. Therefore, a lot of engineering effort and training data is required to adapt models to a specific domain. Accordingly, traditional systems and methods for aspect-based sentiment analysis are typically trained specially for a domain (e.g., opinions about restaurants).

Accordingly, there is a need for improved systems and methods for generic aspect-based sentiment analysis. Embodiments of the present disclosure are directed to this and other considerations.

SUMMARY

Disclosed embodiments may include a system for generic aspect-based sentiment analysis. The system may include one or more processors, and memory in communication with the one or more processors and storing instructions that, when executed by the one or more processors, are configured to cause the system to allow for a customer satisfaction detection system. The system may receive aspect sentiment training data, wherein the aspect sentiment training data has a training polarity of positive, negative or neutral. The system may also train a first machine learning model and a second machine learning model using the aspect sentiment training data. Furthermore, the system may receive call data. Additionally, the system may extract one or more aspects from call data, using the first machine learning model. The system may also apply the second machine learning model to one or more aspects from the call data, wherein the second machine learning model outputs a table of the one or more aspects with a sentiment polarity of positive, negative, or neutral. Additionally, the system may filter the one or more aspects and the associated sentiment polarity into categories. Also, the system may analyze for trends based on the filtered aspects and sentiment polarity. The system may generate a dynamic graphical user interface for displaying the trends. Finally, the system may send the dynamic graphical user interface to a user device for display.

Disclosed embodiments may include a system for generic aspect-based sentiment analysis. The system may include one or more processors, and memory in communication with the one or more processors and storing instructions that, when executed by the one or more processors, are configured to cause the system to allow for generic aspect-based sentiment analysis. The system may receive training data, wherein the training data has a training polarity of positive, negative or neutral. The system may also train a pretrained bidirectional encoder representation from transformers (BERT) model with an unsupervised data augmentation (UDA) module at a span level with the training data. Additionally, the system may receive data. The system may also extract aspects from the data. Furthermore, the system may apply the BERT model to one or more aspects from the data, wherein the BERT model outputs a table of the one or more aspects with a sentiment polarity of positive, negative, or neutral. The system may also filter the aspects and the sentiment polarity into categories. The system may also analyze trends based on the filtered aspects and sentiment polarity. Finally, the system may output a result based on the trends.

Disclosed embodiments may include a system for generic aspect-based sentiment analysis. The system may include one or more processors, and memory in communication with the one or more processors and storing instructions that, when executed by the one or more processors, are configured to cause the system to allow for generic aspect-based sentiment analysis. The system may receive training data, wherein the training data has a training polarity of positive, negative or neutral. The system may also train a machine learning model with the training data at a span level. Additionally, the system may receive data. The system may extract aspects from data. Furthermore, the system may apply the machine learning model to one or more aspects from the data, wherein the machine learning model outputs a table of the one or more aspects with a sentiment polarity of positive, negative, or neutral. Also, the system may filter the aspects and the sentiment polarity into categories. Additionally, the system may analyze for trends based on the filtered aspects and sentiment polarity. Finally, the system may output a result based on the trends.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 1 is a flow diagram illustrating an exemplary method for generic aspect-based sentiment analysis in accordance with certain embodiments of the disclosed technology.

DETAILED DESCRIPTION

Figure 2:
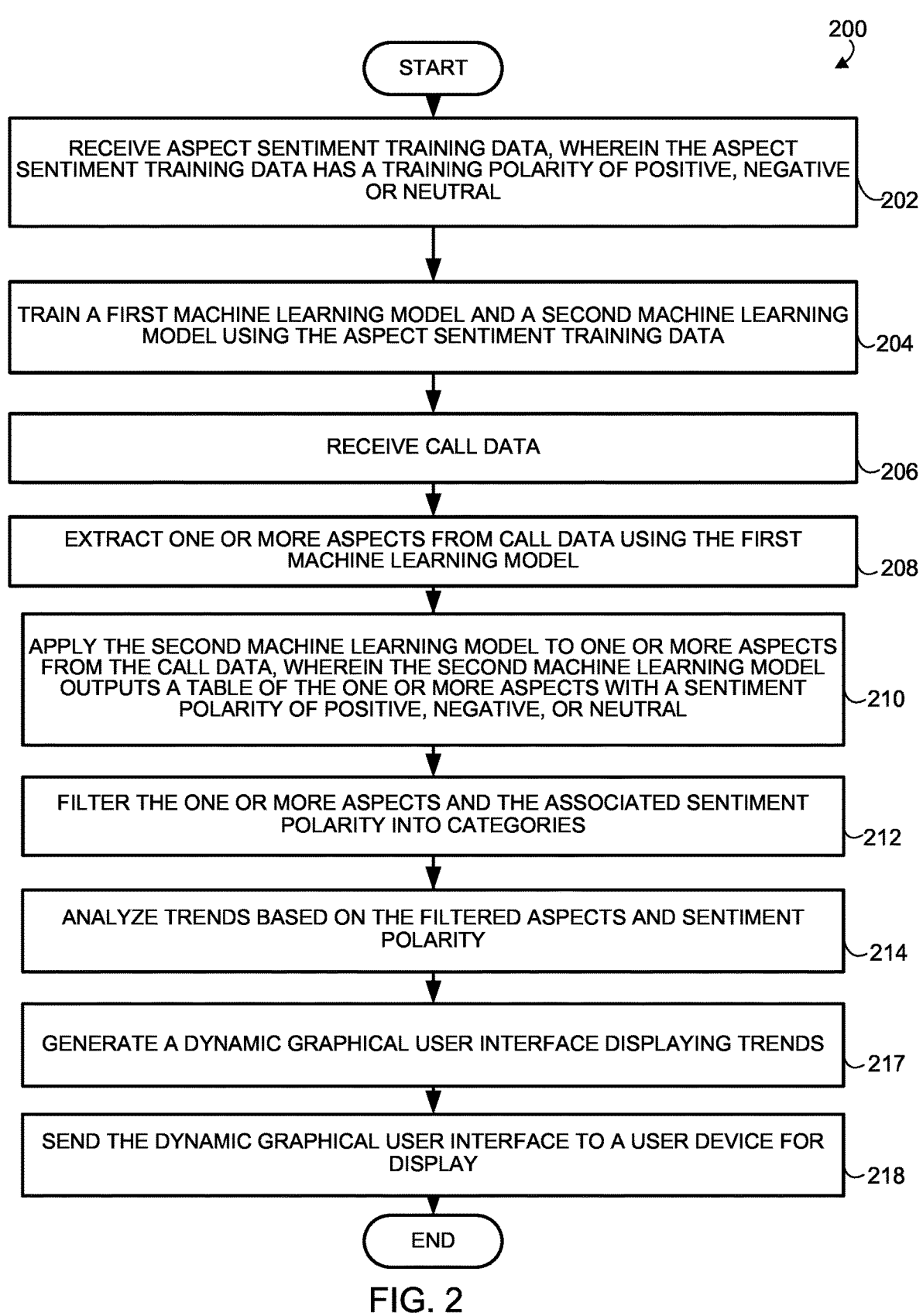
FIG. 2 is a flow diagram illustrating an exemplary method for generic aspect-based sentiment analysis in accordance with certain embodiments of the disclosed technology.

The disclosed technology relates to a system that allows for aspect-based sentiment analysis over an assortment of subjects without requiring specific training for each subject individually. This improvement reduces the need to train machine learning models to detect aspects for specific subject areas and instead allows for generally-trained machine learning models. This can be used to detect customer satisfaction on a variety of different subject matter.

Examples of the present disclosure related to systems and methods for generic aspect-based sentiment analysis. The systems and methods described herein utilize, in some instances, machine learning models, which are necessarily rooted in computers and technology. Machine learning models are a unique computer technology that involves training models to complete tasks and make decisions. The present disclosure details a system that determines customer satisfaction of numerous topics. This, in some examples, may involve using call data converted to text data and a pre-trained bidirectional encoder representation from transformers (BERT) machine learning model using an unsupervised data augmentation (UDA) module to predict if a sentiment is positive, negative, or neutral. Using a machine learning model in this way may allow the system to recognize aspects and predict a sentiment for those aspects at a span-level. This allows for more precision, as the model predicts sentiment at a word level, rather than the sentiment of a complete sentence.

The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details a system that allows the user to interact with trends through a dynamic graphical user interface. This, in some examples, may involve using touch, cursor, or stylus input in addition to output from the machine learning models to dynamically change the graphical user interface. Using a graphical user interface in this way may allow the system to present the data from the machine learning models and allow the user to modify or change the data in a way that is easier to understand.

Furthermore, the disclosed methods and systems are an advantage and improvement over prior technologies that require specific topic training because it allows less time to be spent creating training data for a specific topic. As such, examples of the present disclosure may also improve the speed with which computers can be trained to detect sentiment, because specific training data for specific topics is not needed. Overall, the systems and methods disclosed have significant practical applications in the aspect-based sentiment analysis field because of the noteworthy flexibility of operating without requiring specialized training data for specific subjects, which is important to solving present problems with this technology, as described above.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for generic aspect-based sentiment analysis, in accordance with certain embodiments of the disclosed technology. The steps of method 100 may be performed by one or more components of the system 400 (e.g., sentiment analysis system 320 or web server 410 of data system 408 or user device 402), as described in more detail with respect to FIGS. 3 and 4.

In block 102, the sentiment analysis system 320 may receive training data. The training data may be aspect sentiment training data. There may be separate training data for the first (domain-independent) machine learning model (as described in block 108 below) and the second machine learning model (as described in block 110 below). Alternatively, the training data for the second machine learning model may be same sentences used to train the first machine learning model. The training data may have a training sentiment polarity of positive, negative or neutral.

In block 104, the sentiment analysis system 320 may train a machine learning model using the training data. The training data may be aspect sentiment training data. The machine learning model may be multiple machine learning models. The machine learning models may be transformer machine learning models. The machine learning model may be a pretrained bidirectional encoder representation from transformers (BERT) model. The BERT model may have an unsupervised data augmentation (UDA) module.

The training data for the first (domain-independent) machine learning model may include part-of-speech tags from a pre-trained sentence parser. This may be used to improve the ability of the model to recognize and extract aspects. The aspects may be a noun or a noun-phrase (e.g., "international travel", "Southwest® tickets"). Individual sentences may be provided to the first machine learning model with subjects and direct objects highlighted within the sentence in order to suggest possible aspects for the first machine learning model. This serves to reduce missed aspects (reducing the model's false negatives) and provides more consistency across labelers.

To train the second machine learning model, the sentiment analysis system may instruct the second machine learning model to provide sentiment polarity (positive, neutral, negative) that is associated with the particular aspect with the same sentence as the first machine learning model. The second machine learning model may be given both inputs of the entire sentence and the span indicating the extracted aspect(s) (in cases where multiple aspects exist, each aspect would have its own associated sentiment). The training task for the second machine learning model may be correctly predicting the sentiment associated with the aspect(s) versus known training polarity values. The second machine learning model is therefore trained to predict the sentiment of the aspect rather than the sentence (e.g., at a span-level).

Furthermore, the BERT model with the UDA module may be able to be trained at a span-level using the following steps for single-unigram embodiments: (1) randomly selecting a token in a tokenized original sequence of the training data (while avoiding punctuation of the training data); (2) converting the selected token into a mask; (3) unmasking the token using the BERT model; and (4) verifying that unmasked token does not have the same value as the token prior to being unmasked and verifying that the unmasked token is excluded from a set containing punctuation.

In multi-unigram embodiments, the BERT model may be iterated a number of times related to a length of the tokenized original sequence. This embodiment may include determining whether the unmasked tokens that have values greater than a confidence threshold and only training the BERT model with the unmasked tokens that have values greater than the confidence threshold.

In block 106, the sentiment analysis system 320 may receive data. The data may be call data. The data may be chat data (e.g., from an online chat or text interface). The call data may be call data recorded from a call to a call center (e.g., a customer call where the customer expresses opinion about a certain product of the company). The call data may be converted from audio data to text data (e.g., a transcript). In some embodiments, the call data may be used during the call (e.g., live) or may be used after the call has completed (e.g., recorded). The sentiment analysis system 320 may use parts of a call or the entirety of the call.

In block 108, the sentiment analysis system 320 may extract aspects from the data. Extracting aspects from the from the data may involve using a domain-independent machine learning model or first machine learning model (e.g., from the trained machine learning model in block 104). The sentiment analysis system 320 may, for all of the call data, determine all the aspects in the call data. The first machine learning model may be described as a "sequence to sequence" model that tags input tokens (e.g., word data, letter data) with tags indicating whether it is the beginning of an aspect, inside of an aspect, end of an aspect, or a single aspect token (e.g., the BIOES method, where the tags may be abbreviated such that B indicates beginning; I indicates inside, O indicates outside, E indicates end, and S indicates single). The first machine learning model may output the tags of the input data.

In block 110, the sentiment analysis system 320 may predict the sentiment of the data for each of the aspects. The sentiment analysis system 320 may use a trained BERT model or a second machine learning model (e.g., from the training in block 104) to predict the sentiment one or more aspects from the data. The second machine learning model may output a table of the one or more aspects with a sentiment polarity of positive, negative, or neutral.

The second machine learning model may also be described as a "sequence to sequence" model. The input sequence may be the BIOES tags of the aspects from the first machine learning model of block 108. The output sequence may be positive, negative, or neutral tags. The output sequence tags may be associated only with beginning, inside, end, and single input tags. Outside input tags may not receive an output tag. The output tags may be output in a table associated with the aspects.

In some embodiments blocks 108 and 110 may be completed by a single machine learning model capable of both extracting aspects and determining sentiment at the same time. The tags for this embodiment may be all combinations of BIES (excluding O) and positive, negative, or neutral.

In block 112, the sentiment analysis system 320 may filter the aspects and the sentiment polarity into categories. This step helps to remove any aspects that are not of interest to the business. The aspects that are important to the business may be determined by the nature of the business (e.g., for a car rental business, important phrases may be "full-size," "compact", "hatchback" "blue", or "Ford®"). Sentiment analysis system 320 may filter the data into categories using hierarchical embeddings or clusters. For example, the sentiment analysis system 320 may identify that "full-size" and "compact" cars are both "size options" associated with rental cars. Sentiment analysis system 320 may use an external data source such as a "knowledge base" or "knowledge graph" to perform the domain filtering. This may aid sentiment analysis system 320 in creating categories more accurately.

The sentiment analysis system 320 may use a certain ontology for a given domain (e.g., certain topics that are important to the business). For each aspect, the sentiment analysis system 320 may determine if the aspect is similar to another term or word in the ontology (e.g., using embeddings). If the aspect is similar to another word in the ontology, then the aspect is kept. If the aspect is not similar another word in the ontology, then the aspect is discarded.

Filtering the aspects may use a top-down or a bottom-up approach. In a top-down approach, the sentiment analysis system 320 mines the call transcripts for all of the nouns, that have occurred in the speech or text (e.g., as identified by agents or customers), using an existing sentence part-of-speech parser. For each of the nouns, the sentiment analysis system 320 determines whether the noun relates to product/service that the business provides (e.g., by comparing to a list of products/services provided by the business). Products and services that are not provided by the business are discarded and products and services that are provided by the business are kept and furthered analyzed in further steps.

In a bottom-up approach, the sentiment analysis system 320 may start with a comprehensive list of all products or services provided by a business (e.g., through an expense sheet or company earnings list that is broken down by product/service, or a dedicated index). Then, the sentiment analysis system 320 may, through the aspects identified from the call data, expand the list to include other products and services not already on the comprehensive list.

In block 114, the sentiment analysis system 320 may analyze trends based on the filtered aspects and sentiment polarity. The sentiment analysis system 320 may also use hierarchical embedding or clusters to analyze trends. The sentiment analysis system 320 may determine if the sentiment polarity associated with a filtered aspect or cluster of filtered aspects is predominately positive, negative, or neutral. The sentiment analysis system 320 may perform mathematical analysis to determine sentiments. The mathematical analysis may be an average or other measure of central tendency. The sentiment analysis system 320 may measure the change in the average or measure of central tendency over time. The sentiment analysis system 320 may apply analysis to specific aspects or all aspects. The user may be able to choose which aspects to analyze.

In block 116, the sentiment analysis system 320 may output a result based on the trends. The sentiment analysis system 320 may output the result to the user device. The result may be a spreadsheet showing a list of all of the aspects and the current trends. The result may include graphs. This may be useful to a company during a product launch to determine if a product is a good experience according to customers. This may also indicate to a company which parts of a product are trouble points for customers. The result may be a score regarding a certain category of sentiment.

FIG. 2 is a flow diagram illustrating an exemplary method 200 for generic aspect-based sentiment analysis, in accordance with certain embodiments of the disclosed technology. The steps of method 200 may be performed by one or more components of the system 400 (e.g., sentiment analysis system 320 or web server 410 of data system 408 or user device 402), as described in more detail with respect to FIGS. 3 and 4.

Method 200 of FIG. 2 is similar to method 100 of FIG. 1, except that method 200 may not include blocks 116 of method 100. The descriptions of blocks 202, 204, 206, 208, 210, 212, and 214 in method 200 are similar to the respective descriptions of blocks 102, 104, 108, 110, 112, and 114 of method 100 and are not repeated herein for brevity. Additional blocks 217 and 218 are also described below.

In block 217, the sentiment analysis system 320 may generate a dynamic graphical user interface for displaying the trends. The graphical user interface may be generally similar to the result output of block 116. However, the graphical user interface may present the data, such as graphs and charts in an interactive way (e.g., through assorted colors, highlighting, bolding).

In block 218, the sentiment analysis system 320 may send the dynamic graphical user interface to a user device for display. The user may be able to highlight certain data, remove data (e.g., aspects that they believe to be erroneous). The user may be able to add and/or remove aspects from categories or relationships with other aspects. The user device 402 may receive the user's input through a user input device (e.g., modifying trend data by removing certain aspects or sentiment polarities), such as a touchscreen or mouse, and send the input to the sentiment analysis system 320. Sentiment analysis system 320 may then modify the graphical user interface, and then transmit an updated graphical user interface to the user device 402. This allows the user to modify the output of the sentiment analysis system 320.

Figure 3:
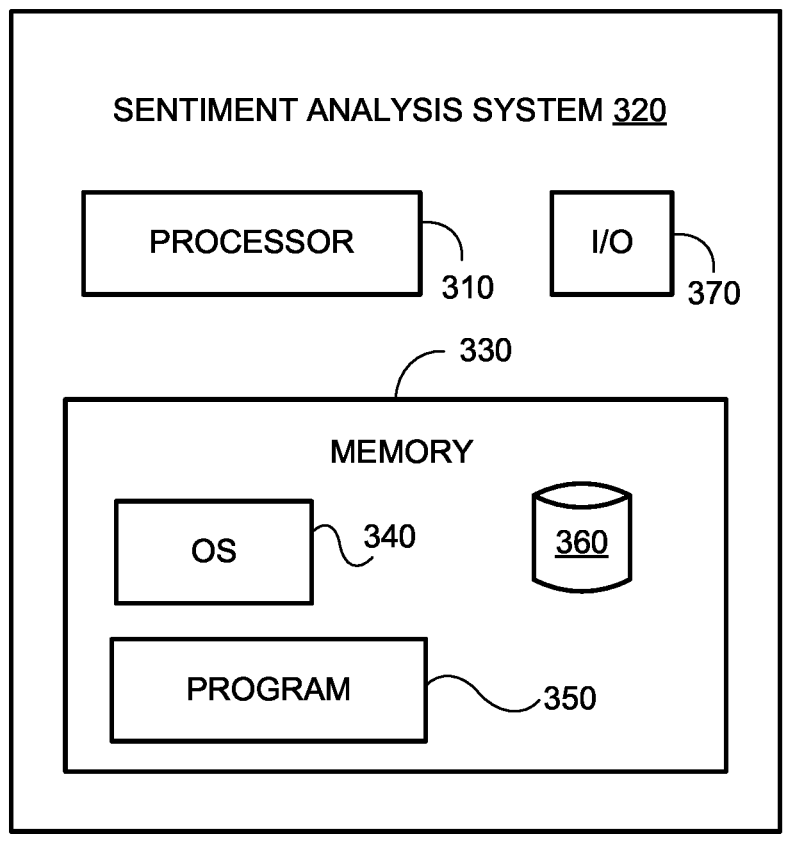
FIG. 3 is block diagram of an example sentiment analysis system used to provide generic aspect-based sentiment analysis, according to an example implementation of the disclosed technology.
Figure 4:
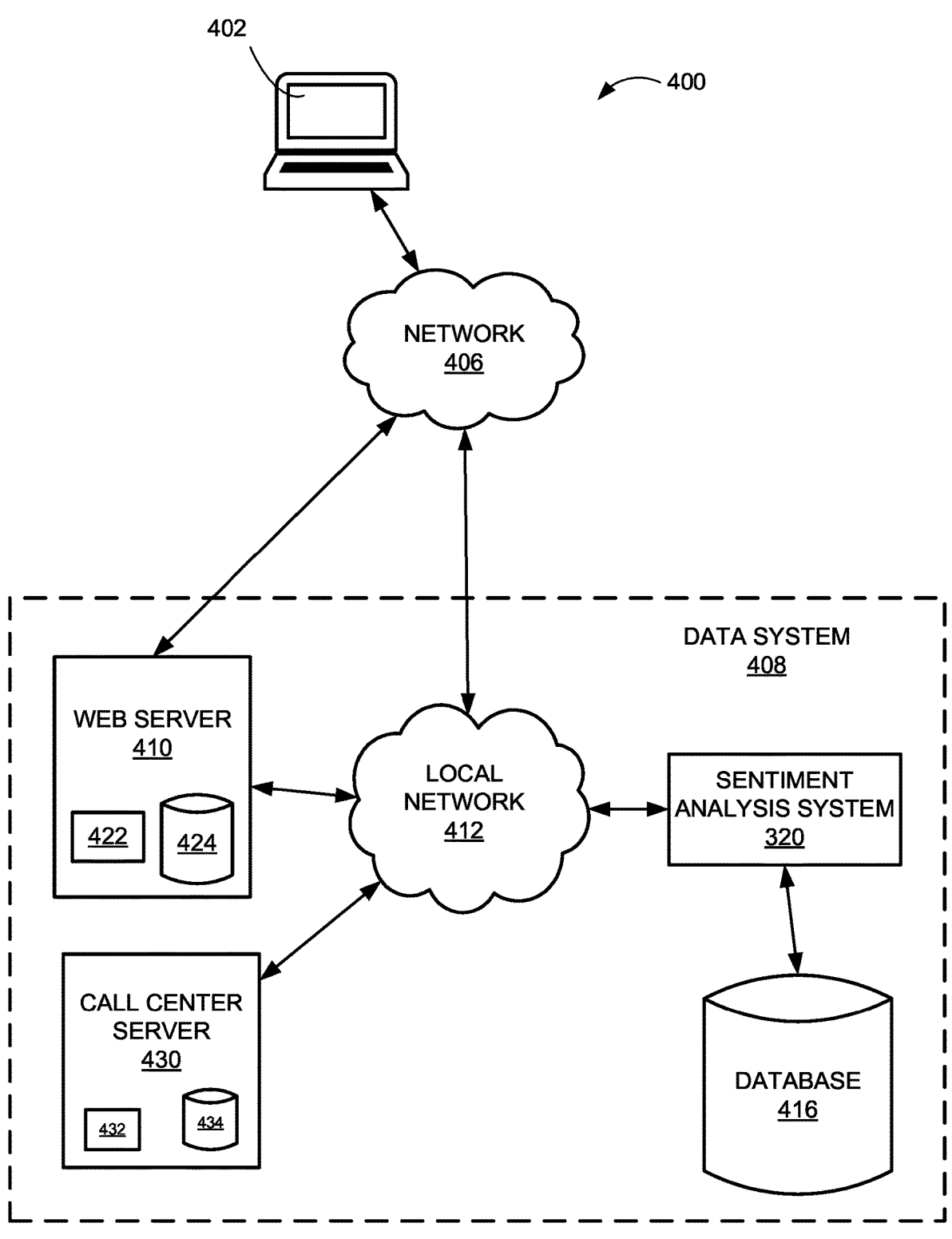
FIG. 4 is block diagram of an example system that may be used to provide generic aspect-based sentiment analysis, according to an example implementation of the disclosed technology.

FIG. 3 is a block diagram of an example sentiment analysis system 320 used to detect customer sentiment according to an example implementation of the disclosed technology. According to some embodiments, the user device 402 and web server 410, as depicted in FIG. 4 and described below, may have a similar structure and components that are similar to those described with respect to sentiment analysis system 320 shown in FIG. 3. As shown, the sentiment analysis system 320 may include a processor 310, an input/output (I/O) device 370, a memory 330 containing an operating system (OS) 340 and a program 350. In certain example implementations, the sentiment analysis system 320 may be a single server or may be configured as a distributed computer system including multiple servers or computers that interoperate to perform one or more of the processes and functionalities associated with the disclosed embodiments. In some embodiments sentiment analysis system 320 may be one or more servers from a serverless or scaling server system. In some embodiments, the sentiment analysis system 320 may further include a peripheral interface, a transceiver, a mobile network interface in communication with the processor 310, a bus configured to facilitate communication between the various components of the sentiment analysis system 320, and a power source configured to power one or more components of the sentiment analysis system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the sentiment analysis system 320 may include one or more storage devices configured to store information used by the processor 310 (or other components) to perform certain functions related to the disclosed embodiments. In one example, the sentiment analysis system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The sentiment analysis system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the sentiment analysis system 320 may include the memory 330 that may include one or more programs 350 to perform one or more functions of the disclosed embodiments. For example, in some embodiments, the sentiment analysis system 320 may additionally manage dialogue and/or other interactions with the customer via a program 350.

The processor 310 may execute one or more programs 350 located remotely from the sentiment analysis system 320. For example, the sentiment analysis system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a sentiment analysis system database 360 for storing related data to enable the sentiment analysis system 320 to perform one or more of the processes and functionalities associated with the disclosed embodiments.

The sentiment analysis system database 360 may include stored data relating to status data (e.g., average session duration data, location data, idle time between sessions, and/or average idle time between sessions) and historical status data. According to some embodiments, the functions provided by the sentiment analysis system database 360 may also be provided by a database that is external to the sentiment analysis system 320, such as the database 416 as shown in FIG. 4.

The sentiment analysis system 320 may also be communicatively connected to one or more memory devices (e.g., databases) locally or through a network. The remote memory devices may be configured to store information and may be accessed and/or managed by the sentiment analysis system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The sentiment analysis system 320 may also include one or more I/O devices 370 that may comprise one or more interfaces for receiving signals or input from devices and providing signals or output to one or more devices that allow data to be received and/or transmitted by the sentiment analysis system 320. For example, the sentiment analysis system 320 may include interface components, which may provide interfaces to one or more input devices, such as one or more keyboards, mouse devices, touch screens, track pads, trackballs, scroll wheels, digital cameras, microphones, sensors, and the like, that enable the sentiment analysis system 320 to receive data from a user (such as, for example, via the user device 402).

In examples of the disclosed technology, the sentiment analysis system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The sentiment analysis system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The sentiment analysis system 320 may be configured to adjust model parameters during training. Model parameters may include weights, coefficients, offsets, or the like. Training may be supervised or unsupervised.

The sentiment analysis system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The sentiment analysis system 320 may be configured to optimize statistical models using known optimization techniques.

Furthermore, the sentiment analysis system 320 may include programs configured to retrieve, store, and/or analyze properties of data models and datasets. For example, sentiment analysis system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The sentiment analysis system 320 may include algorithms to determine a data type, key-value pairs, row-column data structure, statistical distributions of information such as keys or values, or other property of a data schema may be configured to return a statistical profile of a dataset (e.g., using a data-profiling model). The sentiment analysis system 320 may be configured to implement univariate and multivariate statistical methods. The sentiment analysis system 320 may include a regression model, a Bayesian model, a statistical model, a linear discriminant analysis model, or other classification model configured to determine one or more descriptive metrics of a dataset. For example, sentiment analysis system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The sentiment analysis system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, sentiment analysis system 320 may be configured to generate a similarity metric representing a measure of similarity between data in a dataset. A similarity metric may be based on a correlation, covariance matrix, a variance, a frequency of overlapping values, or other measure of statistical similarity.

The sentiment analysis system 320 may be configured to generate a similarity metric based on data model output, including data model output representing a property of the data model. For example, sentiment analysis system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The sentiment analysis system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The sentiment analysis system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, sentiment analysis system 320 is configured to generate and/or train a classification model to classify a dataset, consistent with disclosed embodiments.

The sentiment analysis system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the sentiment analysis system may analyze information applying machine-learning methods.

While the sentiment analysis system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the sentiment analysis system 320 may include a greater or lesser number of components than those illustrated.

FIG. 4 is a block diagram of an example system that may be used to view and interact with data system 408, according to an example implementation of the disclosed technology. The components and arrangements shown in FIG. 4 are not intended to limit the disclosed embodiments as the components used to implement the disclosed processes and features may vary. As shown, data system 408 may interact with a user device 402 via a network 406. In certain example implementations, the data system 408 may include a local network 412, a sentiment analysis system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data system 408. In some embodiments, the user device 402 may include or incorporate electronic communication devices for hearing or vision impaired users.

Users may include individuals such as, for example, employees or independent contractors of an entity associated with the data system 408. The employees or independent contractors may, for example, be tasked with, determining what products and services customers like and/or dislike. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The sentiment analysis system 320 may include programs (scripts, functions, algorithms) to configure data for visualizations and provide visualizations of datasets and data models on the user device 402. This may include programs to generate graphs and display graphs. The sentiment analysis system 320 may include programs to generate histograms, scatter plots, time series, or the like on the user device 402. The sentiment analysis system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data system 408 may be associated with and optionally controlled by one or more entities such as a business, corporation, individual, partnership, or any other entity that provides one or more of goods, services, and consultations to individuals such as customers. In some embodiments, the data system 408 may be controlled by a third party on behalf of another business, corporation, individual, partnership. The data system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the sentiment analysis system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the data system 408 to interact with one another and to connect to the network 406 for interacting with components in the system 400 environment. In some embodiments, the local network 412 may include an interface for communicating with or linking to the network 406. In other embodiments, certain components of the data system 408 may communicate via the network 406, without a separate local network 406.

The data system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data system 408 using the cloud computing environment. User device 402 may be able to access data system 408 using specialized software. The cloud computing environment may eliminate the need to install specialized software on user device 402.

In accordance with certain example implementations of the disclosed technology, the data system 408 may include one or more computer systems configured to compile data from a plurality of sources the sentiment analysis system 320, web server 410, and/or the database 416. The sentiment analysis system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, call data, audio data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

With continued reference to FIG. 4, the call center server 430 may include a computer system configured to receive, process, and route telephone calls and other electronic communications between a customer or user operating a user device 402 and the sentiment analysis system 320. The call center server 430 may have one or more processors 432 and one or more call center databases 434, which may be any suitable repository of call center data. Information stored in the call center server 430 may be accessed (e.g., retrieved, updated, and added to) via the local network 412 (and/or network 406) by one or more devices of the system 400. In some embodiments, the call center server processor 432 may be used to implement an interactive voice response (IVR) system that interacts with the user over the phone or via a voice/audio call portion of an associated mobile application on the user device 402.

Although the preceding description describes various functions of a web server 410, a sentiment analysis system 320, a database 416, a call center server 430, and agent device 440 in some embodiments, some or all of these functions may be carried out by a single computing device.

Example Use Case

The following example use case describes an example of a typical user flow pattern. This section is intended solely for explanatory purposes and not in limitation.

In one example, a customer, Jack, calls his bank for customer service. On the phone Jack mentions several things. Notably, Jack mentions that he (1) "loves his TravelSaver credit card because he gets a bunch of points," but he (2) "can't stand the ATM by his house because it is always broken." He also mentions that his "car is broken, but he had more money to fix it." At the end of the call, sentiment analysis system 320 receives the call data (block 106) and transcribes the call data from audio data into text data. Previously, the sentiment analysis had been trained (block 104) using training data (block 102) to identify aspects. Accordingly, the sentiment analysis system 320 extracts aspects from the text of the call data, such as "TravelSaver", "credit card", "points", "ATM", "car", and "money" (block 108). For each of the aspects, the sentiment analysis system 320, determines a sentiment polarity (block 110). For example: TravelSaver is positive, credit card is neutral, points are positive, ATM is negative, car is neutral, and money is neutral. Sentiment analysis system 320 then filters the aspects and sentiment polarity into categories based on banking products the bank offers (block 112). Points and TravelSaver are determined to be a subset of a credit card category. ATM and money are in categories on their own. Car is removed because it is irrelevant. The sentiment analysis system 320, once receiving other aspect data from other customers, begins to analyze trends (block 114). The sentiment analysis system 320 then outputs a result (block 116) showing that Jack was a representative customer—users associated TravelSaver, points, and money positively, credit card neutral, and ATM negatively. Over the time of a month, these trends were fairly consistent and did not change dramatically.

In some examples, disclosed systems or methods may involve one or more of the following clauses:

Clause 1: A customer satisfaction detection system comprising: one or more processors; memory in communication with the one or more processors and storing instructions that are configured to cause the customer satisfaction detection system to: receive aspect sentiment training data, wherein the aspect sentiment training data has a training polarity of positive, negative or neutral; train a first machine learning model and a second machine learning model using the aspect sentiment training data; receive call data; extract one or more aspects from call data, using the first machine learning model; apply the second machine learning model to one or more aspects from the call data, wherein the second machine learning model outputs a table of the one or more aspects with a sentiment polarity of positive, negative, or neutral; filter the one or more aspects and the associated sentiment polarity into categories; analyze for trends based on the filtered aspects and sentiment polarity; generate a dynamic graphical user interface for displaying the trends; and send the dynamic graphical user interface to a user device for display.

Clause 2: The customer satisfaction detection system of clause 1, wherein the categories are determined using a top-down approach.

Clause 3: The customer satisfaction detection system of clause 2, wherein the categories are determined using hierarchical embedding.

Clause 4: The customer satisfaction detection system of clause 1, wherein the categories are determined using a bottom-up approach.

Clause 5: The customer satisfaction detection system of clause 1, wherein the second machine learning model is a transformer-based neural network.

Clause 6: The customer satisfaction detection system of clause 1, wherein the second machine learning model is a pretrained bidirectional encoder representation from transformers (BERT) model.

Clause 7: The customer satisfaction detection system of clause 6, wherein training the BERT model further includes using an unsupervised data augmentation (UDA) module.

Clause 8: The customer satisfaction detection system of clause 1, wherein filtering the aspects and sentiment polarity into categories comprises a pair of words with variations, wherein the customer satisfaction detection system is configured to score the pair of words the same despite the variations using the model.

Clause 9: The customer satisfaction detection system of clause 1, wherein the second machine learning model processes the aspect sentiment training data at a span level.

Clause 10: The customer satisfaction detection system of clause 1, wherein the aspects are a noun, a noun-phrase, or both, and wherein the memory stores further instructions that are configured to cause the customer satisfaction detection system to: convert audio data to text data.

Clause 11: A generic aspect-based sentiment analysis system comprising: one or more processors; memory in communication with the one or more processors and storing instructions that are configured to cause the generic aspect-based sentiment analysis system to: receive training data, wherein the training data has a training polarity of positive, negative or neutral; train a pretrained bidirectional encoder representation from transformers (BERT) model with an unsupervised data augmentation (UDA) module at a span level with the training data; receive data; extract aspects from the data; apply the BERT model to one or more aspects from the data, wherein the BERT model outputs a table of the one or more aspects with a sentiment polarity of positive, negative, or neutral; filter the aspects and the sentiment polarity into categories; analyze trends based on the filtered aspects and sentiment polarity; and output a result based on the trends.

Clause 12: The generic aspect-based sentiment analysis system of clause 11, wherein the UDA module processes the training data at the span level by: randomly selecting a token in a tokenized original sequence of the training data; converting the selected token into a mask; and unmasking the token using the BERT model.

Clause 13: The generic aspect-based sentiment analysis system of clause 12, wherein the UDA processes the training data at the span level further comprises: verifying that unmasked token does not have the same value as the token prior to being unmasked; and verifying that the unmasked token is excluded from a set containing punctuation.

Clause 14: The generic aspect-based sentiment analysis system of clause 12, wherein randomly selecting the token in the tokenized original sequence of the training data further comprises avoiding punctuation of the training data.

Clause 15: The generic aspect-based sentiment analysis system of clause 12, wherein training the BERT model is iterated a number of times related to a length of the tokenized original sequence.

Clause 16: The generic aspect-based sentiment analysis system of clause 15, further comprising: determining whether the unmasked tokens that have values greater than a confidence threshold; and further training the BERT model with the unmasked tokens that have values greater than the confidence threshold.

Clause 17: A generic aspect-based sentiment analysis system comprising: one or more processors; memory in communication with the one or more processors and storing instructions that are configured to cause the generic aspect-based sentiment analysis system to: receive training data, wherein the training data has a training polarity of positive, negative or neutral; train a machine learning model with the training data at a span level; receive data; extract aspects from data; apply the machine learning model to one or more aspects from the data, wherein the machine learning model outputs a table of the one or more aspects with a sentiment polarity of positive, negative, or neutral; filter the aspects and the sentiment polarity into categories; analyze for trends based on the filtered aspects and sentiment polarity; and output a result based on the trends.

Clause 18: The generic aspect-based sentiment analysis system of clause 17, wherein the machine learning model is a pretrained bidirectional encoder representation from transformers (BERT) model, and training the BERT model further includes using an unsupervised data augmentation (UDA) module that processes training data at the span level by: randomly selecting a token in a tokenized original sequence of the training data; converting the selected token into a mask; unmasking the token using the BERT model; verifying that unmasked token does not have the same value as the token prior to being unmasked; and verifying that the unmasked token is excluded from a set containing punctuation.

Clause 19: The generic aspect-based sentiment analysis system of clause 18, wherein: training the BERT model is iterated a number of times related to a length of the tokenized original sequence; determining whether the unmasked tokens that have values greater than a confidence threshold; and further training the BERT model with the unmasked tokens that have values greater than the confidence threshold.

Clause 20: The generic aspect-based sentiment analysis system of clause 17, wherein the memory stores further instructions that are configured to cause the generic aspect-based sentiment analysis system to: generate a dynamic graphical user interface displaying the trends; send the dynamic graphical user interface to a user device for display; receive, from the user device, modifications to the trends; generate a modified dynamic graphical user interface displaying modified trends; and send the modified dynamic graphical user interface to the user device for display.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A customer satisfaction detection system comprising:
   one or more processors;
   memory in communication with the one or more processors and storing instructions that are configured to cause the customer satisfaction detection system to:
      receive aspect sentiment training data, wherein the aspect sentiment training data has a training polarity of positive, negative or neutral;
      train a machine learning model using the aspect sentiment training data by:
         randomly selecting a token in a tokenized original sequence of the training data;
         converting the selected token into a mask; and
         unmasking the token using the machine learning model;
      receive call data;
      extract one or more aspects from the call data;
      apply the machine learning model to the one or more aspects from the call data, wherein the machine learning model outputs a table of the one or more aspects with a sentiment polarity of positive, negative, or neutral;
      filter the one or more aspects and the associated sentiment polarity into categories;
      analyze for trends based on the filtered aspects and sentiment polarity;
      generate a dynamic graphical user interface for displaying the trends; and
      send the dynamic graphical user interface to a user device for display.

2. The customer satisfaction detection system of claim 1, wherein the categories are determined using a top-down approach.

3. The customer satisfaction detection system of claim 2, wherein the categories are determined using hierarchical embedding.

4. The customer satisfaction detection system of claim 1, wherein the categories are determined using a bottom-up approach.

5. The customer satisfaction detection system of claim 1, wherein the machine learning model is a transformer-based neural network.

6. The customer satisfaction detection system of claim 1, wherein the machine learning model is a pretrained bidirectional encoder representation from transformers (BERT) model.

7. The customer satisfaction detection system of claim 6, wherein training the BERT model further includes using an unsupervised data augmentation (UDA) module.

8. The customer satisfaction detection system of claim 1, wherein filtering the aspects and sentiment polarity into categories comprises a pair of words with variations, wherein the customer satisfaction detection system is configured to score the pair of words the same despite the variations using the machine learning model.

9. The customer satisfaction detection system of claim 1, wherein the machine learning model processes the aspect sentiment training data at a span level.

10. The customer satisfaction detection system of claim 1, wherein the aspects are a noun, a noun-phrase, or both, and wherein the memory stores further instructions that are configured to cause the customer satisfaction detection system to:
    convert audio data to text data.

11. A generic aspect-based sentiment analysis system comprising:
    one or more processors;
    memory in communication with the one or more processors and storing instructions that are configured to cause the generic aspect-based sentiment analysis system to:
        receive training data, wherein the training data has a training polarity of positive, negative or neutral;
        train a pretrained bidirectional encoder representation from transformers (BERT) model with an unsupervised data augmentation (UDA) module at a span level with the training data by:
            randomly selecting a token in a tokenized original sequence of the training data;
            converting the selected token into a mask; and
            unmasking the token using the BERT model;
        receive data;
        extract aspects from the data;
        apply the BERT model to one or more aspects from the data, wherein the BERT model outputs a table of the one or more aspects with a sentiment polarity of positive, negative, or neutral;
        filter the aspects and the sentiment polarity into categories;
        analyze trends based on the filtered aspects and sentiment polarity; and
        output a result based on the trends.

12. The generic aspect-based sentiment analysis system of claim 11, wherein the UDA processes the training data at the span level further comprises:
    verifying that unmasked token does not have the same value as the token prior to being unmasked; and
    verifying that the unmasked token is excluded from a set containing punctuation.

13. The generic aspect-based sentiment analysis system of claim 11, wherein randomly selecting the token in the tokenized original sequence of the training data further comprises avoiding punctuation of the training data.

14. The generic aspect-based sentiment analysis system of claim 11, wherein training the BERT model is iterated a number of times related to a length of the tokenized original sequence.

15. The generic aspect-based sentiment analysis system of claim 14, further comprising:
    determining whether the unmasked tokens that have values greater than a confidence threshold; and
    further training the BERT model with the unmasked tokens that have values greater than the confidence threshold.

16. A generic aspect-based sentiment analysis system comprising:
    one or more processors;
    memory in communication with the one or more processors and storing instructions that are configured to cause the generic aspect-based sentiment analysis system to:
        receive training data, wherein the training data has a training polarity of positive, negative or neutral;
        train a machine learning model with the training data at a span level by:
            randomly selecting a token in a tokenized original sequence of the training data;
            converting the selected token into a mask; and
            unmasking the token using the machine learning model;
        receive data;
        extract aspects from data;
        apply the machine learning model to one or more aspects from the data, wherein the machine learning model outputs a table of the one or more aspects with a sentiment polarity of positive, negative, or neutral;
        filter the aspects and the sentiment polarity into categories;
        analyze for trends based on the filtered aspects and sentiment polarity; and
        output a result based on the trends.

17. The generic aspect-based sentiment analysis system of claim 16, wherein the machine learning model is a pretrained bidirectional encoder representation from transformers (BERT) model, and training the BERT model further includes using an unsupervised data augmentation (UDA) module that further processes training data at the span level by:
    verifying that an unmasked token does not have the same value as the token prior to being unmasked; and
    verifying that the unmasked token is excluded from a set containing punctuation.

18. The generic aspect-based sentiment analysis system of claim 17, wherein:
    training the BERT model is iterated a number of times related to a length of the tokenized original sequence;
    determining whether the unmasked tokens that have values greater than a confidence threshold; and
    further training the BERT model with the unmasked tokens that have values greater than the confidence threshold.

19. The generic aspect-based sentiment analysis system of claim 16, wherein the memory stores further instructions that are configured to cause the generic aspect-based sentiment analysis system to:
    generate a dynamic graphical user interface displaying the trends;
    send the dynamic graphical user interface to a user device for display;
    receive, from the user device, modifications to the trends;

generate a modified dynamic graphical user interface displaying modified trends; and send the modified dynamic graphical user interface to the user device for display.

* * * * *